United States Patent [19]

Hillinger

[11] Patent Number: 5,319,365
[45] Date of Patent: Jun. 7, 1994

[54] PORTABLE HAZARD-WARNING LIGHT ASSEMBLY

[75] Inventor: George Hillinger, Los Angeles, Calif.

[73] Assignee: Alltrade Inc., Long Beach, Calif.

[21] Appl. No.: 126,707

[22] Filed: Sep. 23, 1993

[51] Int. Cl.⁵ .............................................. B60Q 7/00
[52] U.S. Cl. ................... 340/908.1; 340/908; 340/321; 340/331; 340/332; 248/171; 248/188.6; 362/191; 362/428
[58] Field of Search ............... 340/908.1, 908, 331, 340/332, 321, 473; 248/170, 171, 440, 187, 188.4, 188.5, 188.6, 188.7; 362/190, 191, 186, 426, 427, 428, 352, 413, 431, 202, 205, 206, 285, 287

[56] References Cited

U.S. PATENT DOCUMENTS

| | | | |
|---|---|---|---|
| 2,237,536 | 4/1941 | Wells | 362/190 |
| 2,706,610 | 4/1955 | Roberts | 362/191 |
| 2,726,321 | 12/1955 | Riotto | 362/191 |
| 2,949,531 | 8/1960 | Lemelson | 340/908.1 |
| 2,972,739 | 2/1961 | Opper | 340/321 |
| 4,208,703 | 6/1980 | Orr | 362/190 |
| 4,223,860 | 9/1980 | Prest | 248/188.6 |
| 5,175,528 | 12/1992 | Chori et al. | 340/432 |
| 5,203,624 | 4/1993 | Schier et al. | 362/186 |

Primary Examiner—John K. Peng
Assistant Examiner—Nina Tong
Attorney, Agent, or Firm—Albert O. Cota

[57] ABSTRACT

A portable hazard-warning light assembly (10) that is designed to warn on-coming vehicular traffic of a hazardous traffic/road condition. The assembly (10) consists of an elongated tubular body (12) having attached to its top edge (12A) a removable lens head (18) that houses an incandescent light bulb (62) that may be connected to a flasher (36). The bulb and flasher are powered by a single battery (60) that is housed within a battery compartment (20) located at the bottom edge (12D) of the body (12) and that includes a threaded battery compartment cover (28). The body (12) also has attached a slidable leg ring (34A) that has pivotally attached four retractable legs (34D) that are each supported by a leg brace (34H). To extend the legs, the ring (34A) is grasped and lowered. Conversely, to retract the legs, the ring is moved to its upward position. To apply power to the light bulb (62), the cover (28) is rotated which allows the battery (60) to move upwards and complete the electrical power circuit.

23 Claims, 4 Drawing Sheets

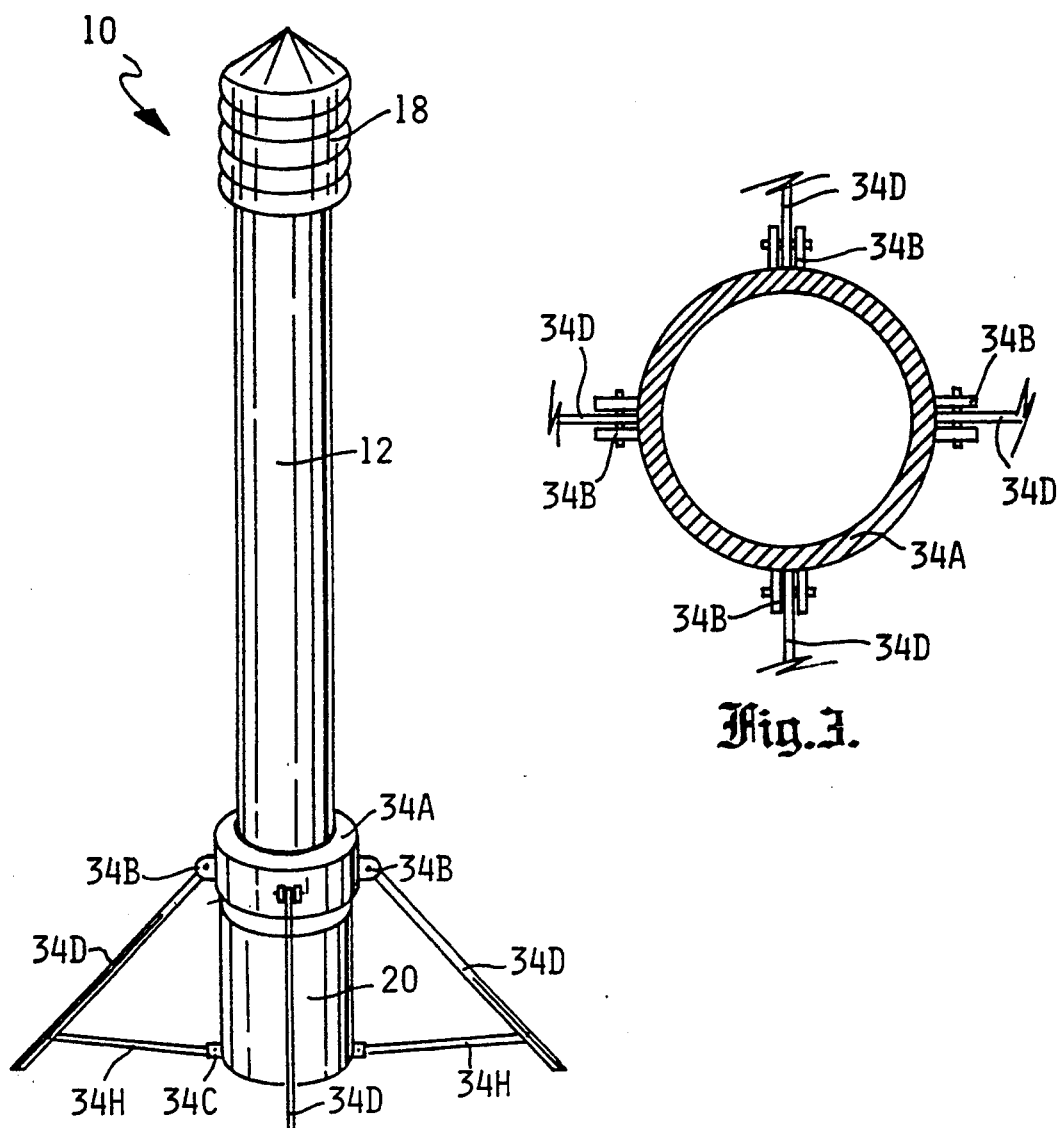
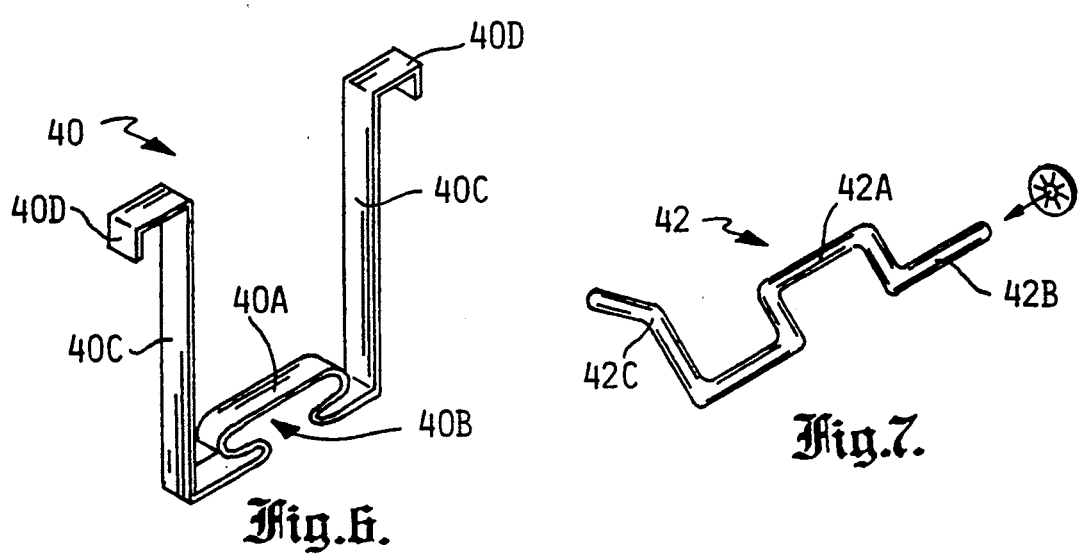

PORTABLE HAZARD-WARNING LIGHT ASSEMBLY

TECHNICAL FIELD

The invention pertains to the general field of hazard warning lights and more particularly to an improved hazard-warning light assembly that incorporates a stable upright platform, a power switching means, and a single conventional light bulb that is powered by a single replaceable battery.

BACKGROUND ART

The most common traffic hazard warning signal in use today by individual, commercial and government drivers/agencies is the single-usage, slow-burn pyrotechnic flare. In the event of a road emergency one or more of these flares are ignited and placed at a sufficient distance from a vehicle accident or disabled vehicle to warn on-coming traffic of a hazardous traffic/road condition. When pyrotechnic flares are ignited and used properly, there are typically no problems. However, because of the hot flame produced by the flare, there always exists a possibility of a problem. There have instances, when the hot flare has been placed too close to an accident area, where the problems caused by the original incident have been compounded by a misused flare. Additionally, flares cannot be easily extinguished once they are ignited and they cannot be easily placed in an upright position. Thus, their visibility is reduced because the flare must be positioned flat on the ground.

As a substitute for flares, there exists in the prior art various designs for electrically operated hazard-warning devices that include a light source. The light source is operated by either internally housed batteries or an electrical connection is available that allows the light source to be energized by means of a cable connected to a vehicle cigarette lighter. Many of the electrically operated light sources also include electronic controlled circuitry that add cost, complexity and increase the failure rate of the devices.

The mechanical design of existing hazard-warning light assemblies varies considerably. In general, a review of the prior art has disclosed that in many of the designs, there is 1) a stability problem for assemblies that are designed to be placed in an upright position, 2) the complexity of the mechanical design, that allows the device to be placed in an upright position, is sufficiently complex that a binding problem can exist which can preclude the device from being placed upright, and 3) the placement of the switch and/or wiring for the electrical circuit that energizes the light source is more complex than need be. Thus, adding to the complexity of the design and a subsequent increase in the failure rate of the assembly.

A search of the prior art did not disclose any patents that read directly on the claims of the instant invention however, the following U.S. patents were considered related:

| U.S. PAT. NO. | INVENTOR | ISSUED |
| --- | --- | --- |
| 5,122,781 | Saubolle | 16 June 1992 |
| 2,237,536 | Wells, Jr. | |

The U.S. Pat. No. 5,122,781 Saubolle patent discloses a hazard warning device that replaces a conventional pyrotechnic flare. Mechanically, the device consists of an upper and a lower collar that are placed around a circular sleeve. The upper collar supports three equidistant rigid legs that are each supported by a strut. When the upper collar is slid upward on the sleeve, the legs are retraced. Conversely, when the upper collar is slid downward, the three legs extend to allow the device to be set and stabilized upon a relatively flat surface. The device utilizes an electronic circuit that includes two high-intensity light emitting diodes that are operated by means of an integrated circuit and other electronic components. The circuit is powered by two lithium button cells.

The U.S. Pat. No. 5,237,536 Wells, Jr. patent discloses a road hazard signaling device that also replaces a conventional pyrotechnic flare. The device consists of a tubular casing having near its upper section three equidistant yokes that pivotally supports three legs that extend longitudinally thereof to support the casing in an upright position. When not in use the legs are folded inwardly and locked in-place into a slotted ring that is located at the bottom end of the casing. At the top of the casing is located a tubular glass housing that houses a light that is powered by two series connected dry cells located within the casing.

For background purposes and as indicative of the art to which the invention relates, reference may be made to the following remaining patents found in the search:

| U.S. PAT. NO. | INVENTOR | ISSUED | |
| --- | --- | --- | --- |
| 4,447,802 | Bose | 8 May | 1984 |
| 3,893,041 | Foster, et al | 1 July | 1975 |
| 3,415,476 | McDermott | 10 December | 1968 |
| 2,972,739 | Opper | 21 February | 1961 |

DISCLOSURE OF THE INVENTION

The portable hazard-warning light assembly provides an alternative to using conventional pyrotechnic flares to alert on-coming vehicular traffic of a potentially dangerous road hazard such as a traffic accident. The assembly in its basic design configuration consists of the following elements:

1. an elongated body having a top edge and a lower section,
2. a bulb socket plate that is sized to fit over the top edge of the elongated body. The plate has a bulb socket attached into which, a light bulb is inserted,
3. a lens head having an inward lip that interfaces and maintains the bulb socket plate against the top edge of the elongated body when the lens head is attached,
4. a battery compartment that houses at least one battery. The compartment has a bottom surface, a lower section and an upper section that is attached to the lower section of the elongated body,
5. a battery compartment cover,
6. an electrical lead means that provides an electrical circuit for connecting the power from the battery to the light bulb,
7. means for selectively controlling the power from the battery to the light bulb, and
8. a leg assembly having a plurality of legs that are pivotally attached to a leg ring that is slidably attached to the elongated body. When the ring is placed in an upward position, the legs retract alongside the body. Conversely, when the ring is placed in its downward position, the legs extend outwardly to support the assembly in an upright stable position.

The assembly is disclosed in a preferred embodiment and a second embodiment. The second embodiment differs only in the methods used for attaching the lens head and the battery compartment to the elongated body, and in the routing and switching of the battery power to the light bulb.

In either embodiment, the light bulb may be connected in series with a current interrupter or "flasher". The flasher is preferably of the bi-metallic type to retain the simplicity of the overall assembly design. The flasher opens and closes automatically when supplied with electrical current from the battery. Thus, allowing the light bulb to blink at a rate determined by the inherent current interruption rate of the selected flasher.

Additionally, the lens head may be configured with a cylindrical, single lens or with a lighthouse-type fresnel lens. Both lenses tinted red and are designed to focus the light beam from the bulb filament to infinity. Also, to increase the visibility of the assembly, especially at night, a reflective material well known in the art, may be attached to selected portions of the body and/or the legs.

In view of the above disclosure, it is the primary object of the invention to provide a portable, hazard-warning light assembly that can be conventionally stored in a vehicle when not in use and quickly made ready for use when required for an emergency situation.

In addition to the primary object of the invention, it is also an object of the invention to provide a hazard-warning light assembly that:

1. its portability is accomplished by designing a leg assembly that easily allows the legs of the assembly to be retracted for storage and quickly extended when it is to be used.
2. may be easily modified to include a flasher unit,
3. is provided with a highly reliable mechanical switch for turning the battery power on and off,
4. is not affected by inclement weather,
5. is cost-effective from both a manufacturer and consumer points of view,
6. is simply constructed with a minimum of parts to increase its reliability, and
7. is maintenance free with the exception of the occasional replacement of the battery and/or the light bulb.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a perspective view of the portable, hazard-warning light assembly.

FIG. 3 is a sectional view taken along the lines 3—3 of FIG. 2.

FIG. 6 is a perspective view of the mechanical lever switch used to turn the battery power on and off in the second embodiment.

FIG. 7 is a perspective view of the switch contact strip used to complete the electrical power circuit of the second embodiment.

BEST MODE FOR CARRYING OUT THE INVENTION

Figure 2:
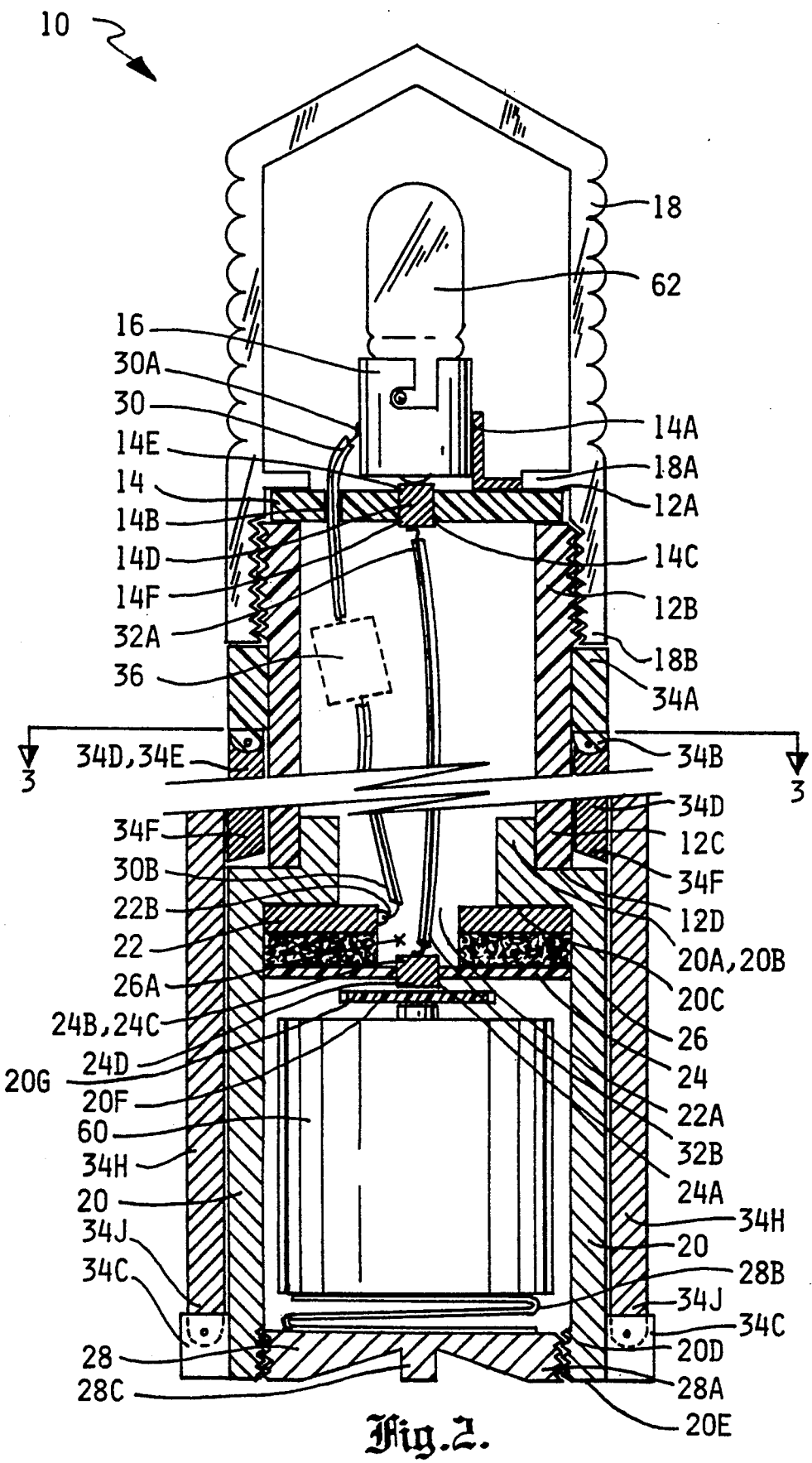
FIG. 2 is a partial sectional view of the preferred embodiment of the light assembly.

The best mode for carrying out the portable hazard-warning light assembly 10 is presented in terms of a preferred and second embodiment. The preferred embodiment as shown in FIGS. 1-4, is comprised of the following major elements: an elongated tubular body 12, a bulb-socket plate 14, a bulb socket 16, a lens head 18, a battery compartment 20, an electrically-conductive battery plate 22, a non-conductive battery plate 24, a resilient spacer 26, a battery compartment cover 28, a negative and positive power lead 30,32 and a leg assembly 34. The second embodiment as shown in FIGS. 5-7 is comprised of the following additional elements: a switch contact strip 40, a mechanical lever switch 42 and a bottom plate 44. Both the preferred and second embodiments operate in combination with a battery 60 and a light bulb 62.

The basic design applicable to both the preferred and second embodiment of the hazard warning light assembly 10 is shown in the perspective view of FIG. 1. The assembly 10 is designed to be placed near the scene of a traffic accident or other road hazard to warn on-coming vehicular traffic of a potentially dangerous situation.

The elongated body 12, as shown in FIGS. 1 and 2, preferably has a tubular shape and is constructed of a high-impact plastic. The body includes a top edge 12A, an upper section having outside threads 12B, a lower section 12C and a bottom edge 12D. Over the top edge 12A of the body is placed a bulb-socket plate 14. The plate 14 has an L-bracket 14A that is attached to one side of the plate's upper surface as shown in FIG. 2. To this L-bracket is then attached by an attachment means, a bulb socket 16 that can be either of the bayonet type as shown in FIG. 2, or of a threaded type (not shown). Adjacent the side of the L-bracket is located therethrough a first bore 14B and a center bore 14C. The center bore has therein an electrically conductive button 14D. This button includes an upper end 14E that extends above the upper surface of the bulb socket plate 14 and a lower end extending below the bottom surface of the plate 14.

To the top edge 12A of the elongated tubular body is attached a lens head 18. As shown best in FIG. 2, the lens head has an inward lip 18A that is located near its lower end and a lower section 18B that includes inside threads. These inside threads are sized to be threaded into the outside threads on the upper section 12B of the body 12. When the lens head 18 is fully threaded to the end of its threads, the lower surface of the inward lip 18A interfaces with and maintains the bulb-socket plate 14 against the top edge 12A of the tubular body 12.

Two types of lens heads may be used, the first as shown in FIG. 2 consists of lighthouse-type fresnel lens; the second as shown in FIG. 5, uses a cylindrical single lens. Both lenses are optically designed to focus their light beam to infinity.

The power supply for the assembly 10 is provided by a battery 60 which is housed within the battery compartment 20. The battery 60 is preferably of the alkaline-manganese dioxide type that provides a nominal voltage of 1.5 volts and can be operated over a temperature range from −4° F. to 130° F. (−20° C. to 54.5° C.). A "C" size battery is preferred. However, by increasing the diameter of the battery compartment, a "D" size may be used.

The battery compartment 20, which is made of an electrically-conductive material, has an upper section 20A having an inwardly extending narrower section 20B that has a lower surface 20C. The narrow section is sized to fit into and be attached by an attachment means into the lower section 12C of the tubular body 12 as shown in FIG. 2. The attachment means may simply consist of a press fit or if necessary a small amount of a compatible adhesive may be used. The lower section 20D of the battery compartment includes a set of inside threads that extend to the compartment's bottom surface 20E.

Contained within the upper portion of the battery compartment 20 as also shown in FIG. 2, are located the electrically-conductive battery plate 22, the non-conductive battery plate 24 and the resilient spacer 26. The electrically-conductive battery plate 22 is sized to fit below and against the lower surface 20C of the battery compartment. The plate 22 has a center bore 22A therethrough that includes on one side, a solder lug 22B.

The non-conductive battery plate 24 also has a center bore 24A therethrough that has therein an electrically conductive button 24B. The button has an upper end 24C that extends above the upper surface of the plate 24 and a lower end 24D that extends below the bottom surface of the plate 24. Between the two plates 22,24 is located the resilient spacer 26 that includes a center bore 26A.

After the battery 60 is inserted into the battery compartment 20, the compartment is sealed by an electrically-conductive battery compartment cover 28. The cover has a set of threads 28A that are sized to be threaded into the threaded lower section 20D of the battery compartment. The inward side of the cover has attached a conductive compression spring 28B and its outward side is designed with a finger-gripping section 28C that allows the cover to be easily gripped and rotated.

The electrical power provided to the assembly 10 by the battery 60, is applied through the negative and positive power leads 30,32 which are connected and routed as follows.

The negative power lead 30 has an upper end 30A that is electrically attached, such as by a soldering method, to the side of the light bulb socket 62. The lower end 30B is routed through the first bore 14B on the bulb socket plate 14 and electrically attached to the solder lug 22B located on the electrically-conductive battery plate 22. From the plate 22, the electrical negative circuit is completed through the structure of the battery compartment 20, the battery compartment cover 28 and the compression spring 28B which makes contact with the negative terminal of the battery 60.

The positive power lead 32 has an upper end 32A that is electrically attached to the lower end 14F of the electrically-conductive button 14D located on the bulb-socket plate 14. The lower end 32B is electrically attached to the upper end 24C of the electrically-conductive button 24B located on the non-conductive battery plate 24.

With the battery 60 inserted into the battery compartment 20, the battery compartment cover 28 is rotated clockwise. This rotation causes the cover to move upward allowing a force via the spring 28B to be applied to the bottom of the battery. The upward moving battery causes the batteries positive terminal to make contact with the lower end 24D of the electrically-conductive button 24B located on the non-conductive battery plate 24. When this positive terminal contact is made, the battery power circuit is completed, allowing power to be applied through the negative and positive power leads 30,32 to the light bulb 62. Note that by turning the battery-compartment cover, the function of an ON-OFF switch is performed. However, if required, a single-pole, single-throw switch can be easily connected in series in either of the power leads and attached to the tubular body 12.

To preclude an inadvertent power turn-on, the battery compartment may include a power activation slot 20F. The slot as shown in FIG. 2, is located between the lower end 24D of the electrically-conductive button 24B on the non-conductive battery plate 24 and the positive terminal of the battery 60. Into this slot is inserted a tight-fitting non-conductive tab 20G that prevents the electrical circuit from being energized when the assembly 10 is not in use. Conversely, when the assembly is to be activated, the tab is pulled out from the slot 20F. To preclude a loss of the tab, the tab can be easily designed with retaining pins on its rear sides that prevent the tab from being completely removed from the slot.

To add additional utility to the assembly 10, a current interrupter 36 or "flasher" can be connected in series with either of the power leads 30,32. Such an interrupter as shown in phantom in FIG. 2, is connected in series with the negative power lead 30 and is located within the elongated tubular body 12. Additionally, to add further visibility to the assembly 10, a light-reflective material may be applied to either or both the elongated body 12 or the legs 34D of the leg assembly 34.

Figure 4:
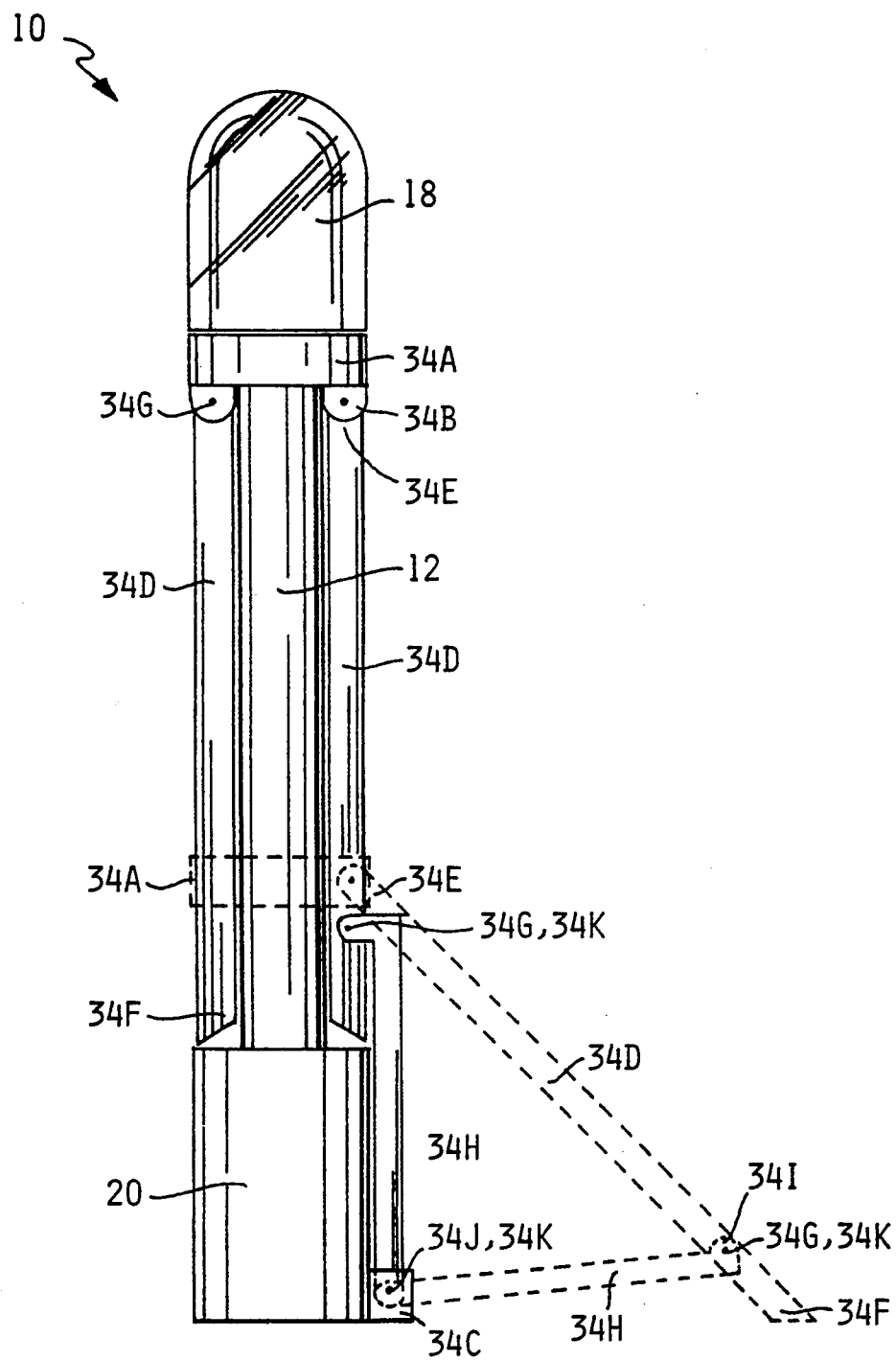
FIG. 4 is an elevational view showing the leg assembly in its retracted, nested position and in phantom in its extended position.
Figure 5:
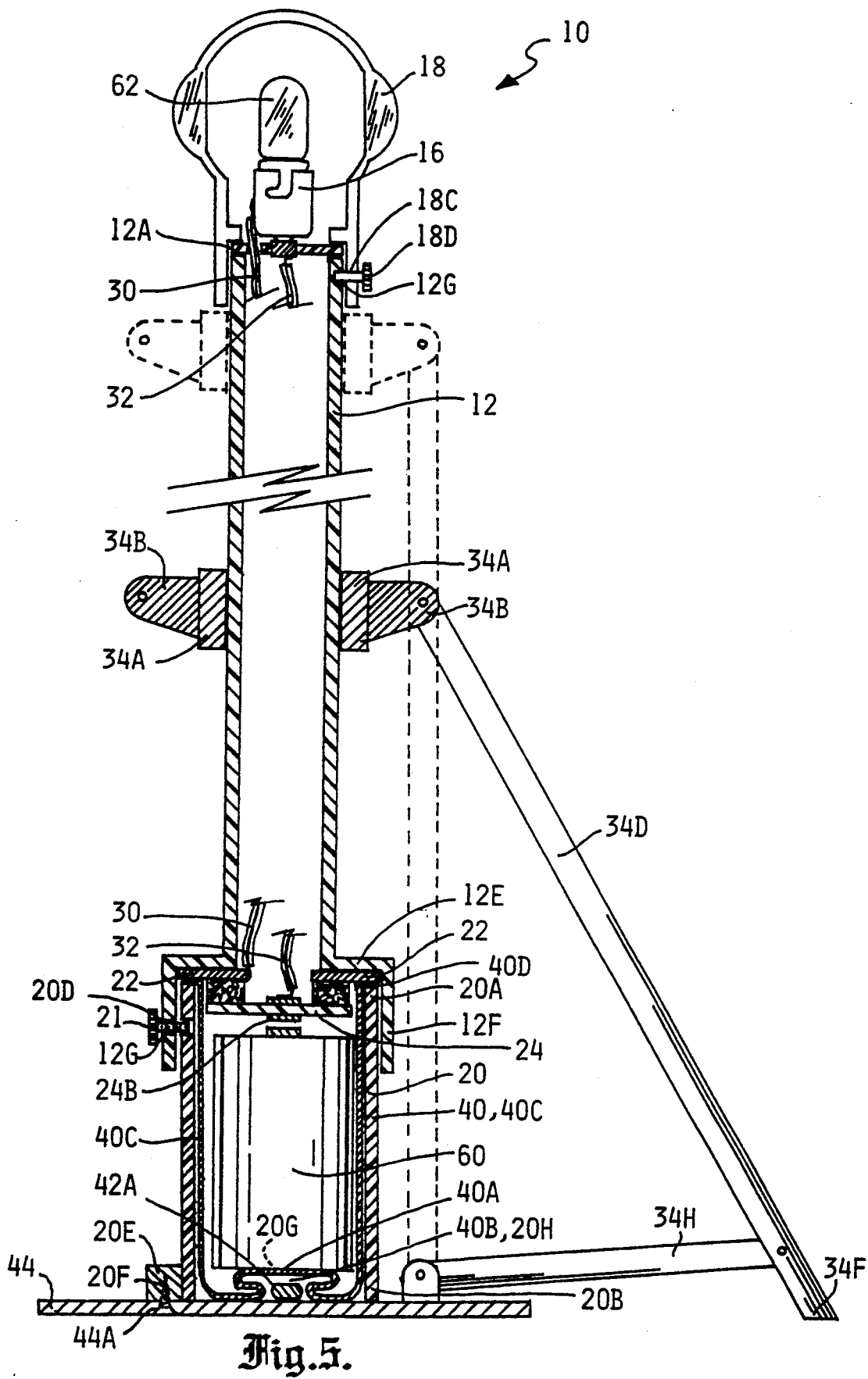
FIG. 5 is a partial sectional view of the second embodiment of the light assembly.

The stability of the assembly 10 is provided by mounting the battery 60 at the bottom of the assembly 10 and primarily by the leg assembly 34 as shown in FIGS. 1, 3 and 4. In FIG. 4, the leg assembly is shown in its retracted configuration nested along the body 12 and battery compartment 20 and in phantom, a typical leg assembly is shown in the extended position.

The leg assembly 34 consists of a slidable leg ring 34A that is sized to be slidably attached around the circumference of the elongated tubular body 12. The leg ring preferably has four downwardly extending ring clevises 34B equally spaced around the circumference of the ring as shown in FIG. 3. Each of the legs 34D have an upper end 34E, a lower end 34F and a brace pin bore 34G near the lower end of the leg. The upper end is swivelly attached by an attachment means to one of the respective clevises 34B on the slidable leg ring 34A. Around the lower edge circumference of the battery compartment 20 are located four equally spaced base clevises 34C that are in alignment with the respective ring clevises 34B.

The structural support and distance limiter for the legs 34D is provided by a leg brace 34H. Each brace includes an upper end 34I and a lower end 34J. The upper end 34I has a pin bore 34K therethrough that is swivelly attached to the pin bore 34G on one of the respective legs 34D. The lower end 34J also has a pin bore 34K therethrough that is swivelly attached to the respective first through fourth base clevises 34C. When the slidable leg ring 34A is slid upwards, the legs 34D and braces are nested alongside the surfaces of the body 12 and battery compartment 20 respectfully. Conversely, when the ring 34A is slid to its downward position as shown in FIG. 4, each of the legs 34D are extended outwardly and are supported by the respective leg brace. With the legs extended, the portable, hazard-warning light assembly 10 is supported in a stable position.

The second embodiment of the assembly 10 differs from the preferred embodiment in the method of attaching the lens head 18 to the elongated body 12, the shapes of the elongated body 12 and battery compartment 20 and the electrical circuit design for providing the power from the battery 60 to the light bulb 62.

The means for attaching the lens head 18 to the body 12 as shown in FIG. 5, consists of having at least one threaded bore 12G located near the top edge 12A of the body 12. The lens head 18 also has at least one threaded bore 18C at its lower section that are in alignment with the threaded bores 12G on the body 12. To secure the lens head to the body, a threaded knob 18D is inserted into the two threaded bores and rotated until the lens head 18 is tightened against the elongated body 12. In the second embodiment, the body 12 has an outward extending horizontal flange 12E that terminates with downward extending sides 12F. The sides include at least one threaded bore 12G.

The battery compartment 20 of the second embodiment consists of a tubular structure having an upper section 20A that is sized to tightly fit into the downward extending sides 12F of the elongated body 12. The sides of the compartment 20 have at least one threaded bore 20D that are in alignment with the threaded bores 12G on the sides of the elongated body 12. When a threaded bolt 21 is inserted into two aligned bores, the battery compartment 20 is secured to the body 12. The battery compartment further has at least one outward projecting fastening block 20E that is attached to the sides and flush with its bottom surface 20B. The blocks 20E each have a threaded bore 20F that extends from its bottom surface. On one side of the battery compartment 20 is also located an axle bore 20G and on the opposite side is located a lever slot 20H.

As shown in FIGS. 6 and 7, the second embodiment also includes a switch contact strip 40 and a mechanical lever switch 42. The switch contact strip 40 has a spring section 40A on its bottom end that includes an opening 40B and contiguous sides 40C. Each side includes a hook section 40D on the upper terminating end as shown in FIG. 6. The hooks 40D hook over the upper section 20A of the battery compartment. In this configuration, the hooks make an electrical contact with the electrically-conductive battery plate 22 which is connected by the negative power lead 30 to the bulb socket 16. When so hooked, the strip 40 is sized so that the bottom of the spring section 40A is flush with the bottom surface 20O of the battery compartment 20. When a battery 60 is located within the battery compartment 20, the negative terminal of the battery 60 rests on the top surface of the switch contact strip 40.

The mechanical lever switch 42 has a center section 42A that is located above an axle 42B on one side and an angled lever 42C on the other side. The center section 42A as shown in FIG. 5, is placed inside the opening on the switch contact strip 40. The end of the axle 42B projects through the axle bore 20G on the battery compartment 20 and the angled lever 42C projects through the lever slot 20H also on the battery compartment 20. When the lever 42C is moved downward, the center section 42A is rotated upwards. This action causes the battery 60 to move up and make contact with the electrically-conductive button 24B on the non-conductive battery plate 24 which then completes the positive side of the battery power circuit as previously described.

To complete the structure of the second embodiment, a bottom plate 44 is attached to the bottom surface 20E of the battery compartment 20. The attachment is made by means of threaded bolts that are threaded through at least one bolt bore 44A on the bottom plate. The bolts terminate into the fastening blocks 20E on the battery compartment 20.

While the invention has been described in complete detail and pictorially shown in the accompanying drawings, it is not to be limited to such details, since many changes and modifications may be made to the invention without departing from the spirit and the scope thereof. Hence, it is described to cover any and all modifications and forms which may come within the language and scope of the claims.

I claim:

1. An improved hazard-warning light assembly comprising:
    a) an elongated body having a top edge and a lower section,
    b) a bulb socket plate having an attachment means, a bulb socket, and sized to fit over the top edge of said elongated body, where into the bulb socket is inserted and attached a light bulb,
    c) a lens head having an inward lip that interfaces and maintains said bulb socket plate against the top edge of said elongated body when said lens head is attached to said elongated body, by an attachment means,
    d) a battery compartment that houses at least one battery and having an upper section that is attached by an attachment means to the lower section of said elongated body, a lower section and a bottom surface,
    e) a battery compartment cover,
    f) an electrical lead means having at least two electrical leads, that provides an electrical circuit for connecting the power from said battery to said light bulb,
    g) means for selectively controlling the power from said battery to said light bulb, and
    h) a leg assembly having a plurality of legs that are pivotally attached to a leg ring that is slidably attached to said elongated body, whereupon when said ring is placed in an upward position, said legs retract alongside said body and conversely, when said ring is placed in its downward position, said legs extend to support said assembly in an upright stable position.

2. The assembly as specified in claim 1 wherein said elongated body has a tubular shape, the top edge, an upper section having outside threads, the lower section and a bottom edge.

3. The assembly as specified in claim 2 wherein said bulb-socket plate further comprises:
    a) an L-bracket attached to one side of the upper surface of said plate where to the L-bracket is attached by an attachment means the bulb socket,
    b) a first bore therethrough located adjacent the side of the L-bracket, and
    c) a center bore therethrough having therein an electrically conductive button that includes an upper end that extends above the upper surface of said bulb socket plate and a lower end that extends below the bottom surface of said bulb socket bulb.

4. The assembly as specified in claim 2 wherein said lens head being attached to said elongated body comprise the lens head with a lower section having inside threads that are sized to be threaded into the outside threads on the upper section of said elongated body.

5. The assembly as specified in claim 4 wherein said lens head is with a cylindrical, single lens that focus a light beam at infinity.

6. The assembly as specified in claim 4 wherein said lens head is with a lighthouse-type fresnel lens.

7. The assembly as specified in claim 2 wherein said battery compartment further comprises said upper section having an inwardly extending narrower section that is sized to fit into and be attached by the attachment means to the lower section of said elongated body the lower section that includes inside threads and the bottom surface.

8. The assembly as specified in claim 7 further comprising an electrically conductive battery plate sized to fit below and against the lower surface of said battery compartment with said conductive battery plate having a center bore therethrough that includes on one side of said center bore a solder lug.

9. The assembly as specified in claim 8 further comprising a non-conductive battery plate having a center bore therethrough that has therein an electrically conductive button having an upper end that extends above the upper surface of said non-conductive battery plate and a lower end that extends below the bottom surface of said non-conductive battery plate.

10. The assembly as specified in claim 9 further comprising a resilient spacer having a center bore therethrough and that is located between said electrically conductive battery plate and said non-conductive battery plate.

11. The assembly as specified in claim 9 wherein said electrical lead means for connecting the power from said battery to said light bulb comprises:
   a) a negative power lead having an upper end electrically attached to the side of said bulb socket and where a lower end is routed through a first bore on said bulb socket plate and electrically attached to the solder lug on said electrically conductive battery plate from where the electrical circuit is completed through the structure of said battery compartment, said battery compartment cover and a compression spring which makes contact with the negative terminal of said battery, and
   b) a positive power lead having an upper end electrically attached to the lower end of the electrically conductive button on said bulb-socket plate and where a lower end of said positive power lead is electrically attached to the upper end of the electrically conductive button on said non-conductive battery plate, wherein when said battery is inserted into said battery compartment and said battery compartment cover is rotated to move said cover upward, a force via the spring is exerted on the bottom of said battery that allows the positive terminal of said battery to make contact with the lower end of the electrically conductive button on said non-conductive battery plate whereupon a battery power circuit is completed allowing power to be applied through said negative power lead and said positive power lead to the light bulb.

12. The assembly as specified in claim 9 wherein said battery compartment further comprises a power activation slot located between the lower end of the electrically conductive button on said non-conductive battery plate and the positive terminal of said battery, where into said slot is inserted a non-conductive tab that prevents the electrical circuit from being energized when said assembly is not in use, and conversely when assembly is to be used, said tab is pulled out from said slot.

13. The assembly as specified in claim 1 wherein said battery compartment cover is electrically conductive, has an inward side that has attached a conductive spring and an outward side that includes a finger-gripping section.

14. The assembly as specified in claim 2 wherein said leg assembly further comprises:
   (a) the slidable leg ring sized to be slidably attached around the circumference of said elongated tubular body, said leg ring having four downwardly extending ring clevises equally spaced around the circumference of said leg ring,
   (b) each of said legs having an upper end and a lower end having a brace pin bore therethrough, where a each of said legs is swivelly attached by an attachment means to one of said clevises on said leg ring,
   (c) four base clevises equally spaced around the lower edge circumference of said battery compartment in alignment with the respective ring clevises,
   (d) each of leg braces having an upper end and a lower end with the upper end having a pin bore therethrough that is swivelly attached to the pin bore on one of said respective legs and with the lower end also having a pin bore therethrough that is swivelly attached to the respective four base clevises, whereupon when said leg ring is slid upwardly, said legs and braces retract and nest alongside the surface of said tubular body and said battery compartment respectively and conversely, when said leg ring is slid to its downward position each of said legs extend outwardly and are supported by the respective said leg brace to allow said portable, hazard warning light assembly to be supported in the stable position.

15. The assembly as specified in claim 1 further comprising a current interrupter attached in series with either of said electrical leads where said interrupter opens and closes automatically when supplied with current from said battery causing said light bulb to blink intermittently.

16. The assembly as specified in claim 2 wherein said lens head being attached to said elongated body comprises:
   a) at least one threaded bore located near the top edge of said elongated body,
   b) said lens head having at least one threaded bore at its lower section that are in alignment with the threaded bores on said elongated body, and
   c) a threaded knob that when inserted into said threaded bores and rotated, said lens head is tightened against said elongated body.

17. The assembly as specified in claim 16 wherein the lower section of said elongated body has an outward extending horizontal flange that terminates with downward extending sides that include at least one threaded bore.

18. The assembly as specified in claim 17 wherein said battery compartment comprises a tubular structure having an upper section that is sized to tightly fit into the downward extending sides of said elongated body, with the sides of battery compartment having at least one threaded bore in alignment with the threaded bore on the sides of said elongated body, whereupon when a threaded bolt is inserted into said threaded bores, said battery compartment is attached to said elongated body, where said battery compartment further has at least one outward projecting fastening block that is attached to the sides and flush with the bottom surface of said battery compartment with said block having a threaded bore that extends from its bottom surface and said battery compartment further having an axle bore on one side and a lever slot on the opposite side.

19. The assembly as specified in claim 18 further comprising a switch contact strip having a spring section on its bottom end that includes an opening, and contiguous sides that have a hook section, which having at least two hooks, on their upper terminating ends that hook over the upper section of said battery compartment where the hooks make an electrical contact with a electrically conductive battery plate which is connected by a negative power lead to said bulb socket, where when so hooked, said strip is sized so that the bottom of the spring section is flush with the bottom surface of said battery compartment such that when the battery is located within said battery compartment the negative terminal of said battery rests on the top surface of said switch contact strip.

20. The assembly as specified in claim 19 further comprising a mechanical lever switch having a center section that is located above an axle on one side and an angled lever on the other side, where the center section is placed inside the opening on said switch contact strip with the axle end projecting through the axle bore on said battery compartment and the angled lever projecting through the lever slot on said battery compartment, where when the lever is moved downward, the center section is rotated upwards causing said battery to move up and make contact with a electrically/conductive button on a non-conductive battery plate which then completes a positive side of the battery power circuit.

21. The assembly as specified in claim 20 further comprising a bottom plate that attaches to the bottom surface of said battery compartment by means of threaded bolts that are threaded through at least one bolt bore on said bottom plate and that terminate into the fastening block on said battery compartment.

22. The assembly as specified in claim 2 further comprising a light-reflective material that is applied to said elongated body and to the legs of said leg assembly.

23. An improved hazard-warning light comprising:
a) a elongated tubular body having a top edge, an upper section having outside threads, a lower section and a bottom edge,
b) a bulb socket plate sized to fit over the top edge of said tubular body, with said plate having:
  (1) an L-bracket attached to one side of the upper surface of said plate,
  (2) a first bore therethrough located adjacent the side of the L-bracket, and
  (3) a center bore therethrough having therein an electrically conductive button having an upper end that extends above the upper surface of said bulb socket plate and a lower end that extends below the bottom surface of said bulb socket plate,
c) a bulb socket attached by an attachment means to the L-bracket,
d) a lens head having an inward lip located near the lower end of said lens head and a lower section having inside threads sized to be threaded into the outside threads on said tubular body where when threaded to the end of said threads, the lower surface of the inward lip interfaces and maintains said bulb socket plate against the top edge of said tubular body,
e) a battery compartment with an upper section having an inwardly extending narrower section that is sized to fit into and be attached by an attachment means to the lower section of said tubular body, a lower section that includes inside threads and a bottom surface,
f) an electrically conductive battery plate sized to fit below and against the lower surface of said battery compartment with said conductive battery plate having a center bore therethrough that includes on one side of said center bore solder lug,
g) a non-conductive battery plate having a center bore therethrough that has therein an electrically conductive button having an upper end that extends above the upper surface of said non-conductive battery plate and a lower end that extends below the bottom surface of said non-conductive battery plate,
h) a resilient spacer having a center bore therethrough and that is located between said electrically conductive battery plate and said non-conductive battery plate,
i) a battery,
j) an electrically conductive battery compartment cover having threads sized to be threaded into the threaded lower section of said battery compartment, said cover having an inward side that has attached a conductive compression spring and an outward side having a finger-gripping section,
k) a negative power lead having an upper end electrically attached to the side of said bulb socket and where the lower end is routed through the first bore on said bulb socket plate and electrically attached to the solder lug on said electrically conductive battery plate from where the electrical circuit is completed through the structure of said battery compartment, said battery compartment cover and said compression spring which makes contact with the negative terminal of said battery,
l) a positive power lead having an upper end electrically attached to the lower end of the electrically attached to the lower end of the electrically-conductive button on said bulb-socket plate and where a lower end of said positive power lead is electrically attached to the upper end of the electrically-conductive button on said non-conductive battery plate, where when said battery is inserted into said battery compartment and said battery compartment cover is rotated to move said cover upward, a force via the spring is exerted on the bottom of said battery that allows the positive terminal of said battery to make contact with the lower end of the electrically conductive button on said non-conductive battery plate whereupon the battery power circuit is completed allowing power to be applied through said negative power lead and said positive power lead to the light bulb,
m) a leg assembly comprising:
  (1) a slidable leg ring sized to be slidably attached around the circumference of said elongated tubular body, said leg ring having four downwardly extending ring clevises equally spaced around the circumference of said leg ring, (2) each of a plurality of legs having an upper end and a lower end having a brace pin bore therethrough, where each of said legs is swivelly attached by an attachment means to one of said respective clevises on said leg ring, (3) four base clevises equally spaced around the lower edge circumference of said battery compartment in alignment with the respective ring clevises, (4) each of a plurality of leg braces having an upper end and a lower end with the upper end having a pin bore therethrough that is swivelly attached to the pin bore on one of said respective legs and with the lower end also having a pin bore therethrough that is swivelly attached to the respective first through fourth base clevises, whereupon when said leg ring is slid upwardly, said legs and braces retract and nest alongside the surface of said tubular body and said battery compartment respectively and conversely, when said leg ring is slid to its downward position each of said legs extend outwardly and are supported by the respective said leg brace to allow said portable, hazard warning light assembly to be supported in an upright stable position.

* * * * *